April 18, 1967 E. P. MORRIS 3,314,164
VENEER DRYER

Filed Aug. 30, 1965 6 Sheets-Sheet 1

FIG. 1

INVENTOR.
EDWARD P. MORRIS
BY
*Hoffmann and Yount*
ATTORNEYS

INVENTOR.
EDWARD P. MORRIS
BY
Hoffmann and Yount
ATTORNEYS

April 18, 1967 E. P. MORRIS 3,314,164
VENEER DRYER

Filed Aug. 30, 1965 6 Sheets-Sheet 4

FIG. 4

INVENTOR.
EDWARD P. MORRIS
BY
Hoffmann and Yount
ATTORNEYS

April 18, 1967  E. P. MORRIS  3,314,164

VENEER DRYER

Filed Aug. 30, 1965  6 Sheets-Sheet 5

INVENTOR.
EDWARD P. MORRIS
BY
Hoffmann and Yount
ATTORNEYS

April 18, 1967  E. P. MORRIS  3,314,164
VENEER DRYER

Filed Aug. 30, 1965  6 Sheets-Sheet 6

INVENTOR.
EDWARD P. MORRIS
BY
*Hoffmann and Yount*
ATTORNEYS

United States Patent Office 3,314,164
Patented Apr. 18, 1967

3,314,164
VENEER DRYER
Edward P. Morris, Painesville, Ohio, assignor to The Coe Manufacturing Company, Painesville, Ohio, a corporation of Ohio
Filed Aug. 30, 1965, Ser. No. 483,676
9 Claims. (Cl. 34—155)

The invention relates to the drying of relatively thin, rigid or semi-rigid sheet-like material, more particularly veneer, as a continuous operation.

This application is a continuation-in-part of my copending application Ser. No. 397,886, which is a continuation-in-part of my prior application, Ser. No. 144,651, filed Oct. 12, 1961, now abandoned. The applications are included herein by reference including the specification, claims and drawings.

One of the principal objects of the present invention is the provision of a novel and improved method of an apparatus for drying veneer wherein the veneer is continuously conveyed in one or a plurality of paths through a drying chamber either as it comes from the veneer lathe with its grain extending crosswise of its direction of travel or as individual sheets with its grain extending lengthwise of its direction of travel.

Another important object of the present invention is to provide a novel and improved drying apparatus in which a conveyor, or a plurality of conveyors arranged in tiered relationship continuously moves veneer through a drying chamber along a prescribed path or paths and wherein it is subjected to jets of heated air discharged from openings in a plurality of conduits disposed on opposite sides of the prescribed path or paths of travel of the material and which conduits preferably are so mounted that they can be readily removed to provide access to the drying chamber and/or to repair or replace same.

Another object of the present invention is to provide a drying apparatus of the character referred to wherein the conveyor or conveyors comprise a plurality of spaced pairs of rolls and the rolls of each pair are disposed in vertical alignment and between which veneer travels as it moves through the drying apparatus and wherein the conduits having the openings therein for directing jets of heated air onto the surfaces of the veneer as it passes through the dryer are located between the pairs of rolls and on opposite sides of the path of travel of the material.

A further object of the present invention is to provide a drying apparatus of the character referred to wherein guide means are associated with the conduits and are effective to return the veneer being dried to its prescribed path of travel in the event it deviates therefrom in the course of movement through the dryer thus preventing jamming of the material in the apparatus.

Another object of the present invention is the provision of a novel and improved apparatus for drying veneer, comprising an elongated housing having one or more conveyors therein adapted to continuously convey material therethrough in a prescribed path or paths which conveyor or conveyors includes horizontally spaced pairs of driven rolls with the rolls of each pair of rolls disposed in vertical alignment and between which the veneer travels, conduit means disposed on opposite sides of the veneer path between the pairs of rolls and having orifices or nozzles in the side thereof facing the veneer path for directing a drying medium, preferably heated air, against opposite sides of the veneer as it moves through the dryer, and means for providing and circulating or forcing heated air through the conduit means and out the orifices or nozzles therein onto opposite sides of the material at a relatively high velocity.

Another object of the present invention is the provision of a novel and improved dryer apparatus of the character referred to wherein the conduit means has inclined surfaces facing the path of travel of the veneer being dried which converge towards the path of travel and in the direction in which the veneer is converged so that in the event a leading edge of the veneer veers from its prescribed path of travel and collides with one of the facing surfaces of the conduit, the inclined slope will guide the veneer across the inclined face and return it to its prescribed path of travel for movement through the following pair of rolls.

A further object of the present invention is to provide a drying apparatus of the type referred to wherein the conduits or nozzles therefor, and in particular the inclined surfaces thereof facing the veneer being dried and through which the drying medium is discharged can be positioned close to the prescribed path of travel of the veneer and consequently provide for effective drying of the veneer while preventing the veneer from becoming jammed while moving through the drying apparatus.

The invention resides in constructions, and combinations and arrangements of parts and further objects and advantages of parts and further objects and advantages of the invention will be apparent to those skilled in the art to which it relates from the following description of the preferred embodiment described with reference to the accompanying drawings forming a part of the specification, in which similar reference numeral characters designate corresponding parts and in which.

While the invention is susceptible of being otherwise embodied, it is herein shown and described as applied to a three deck, gas-fired dryer especially designed for the drying of relatively thin wet or green hardwood veneer cut to predetermined lengths. It is to be understood, however, that there is no intention to limit the invention to the specific embodiment shown. On the contrary, it is intended to hereby cover all modifications and alternative constructions falling within the spirit and scope of the invention as expressed in the appended claims.

Referring to the drawings, the dryer shown is of the continuous type i.e. dries veneer as it moves continuous therethrough, and comprises an elongated housing, designated generally as A, including a suitable framework B. The housing A has a plurality of access doors 10 along its two opposite long sides. The housing provides an elongated drying chamber C of rectangular shape in cross section through which the veneer to be dried is moved lengthwise of the dryer, that is, from left to right as viewed in FIG. 1, while a drying medium, such as heated air, is directed at high velocity and in generally vertical direction against opposite sides of the veneer. The veneer designated by the reference character V, is carried through the drying chamber C in vertically spaced, substantially horizontal paths by a plurality of tiered or superimposed power driven conveyors, in the present instance three, designated generally by the reference characters D, E, F.

The veneer may be fed in any convenient manner into the wet or lefthand end of the dryer, as viewed in the drawings, preferably as sheets of uniform or random width, approximately four and one half to sixteen and one half feet long, as is the usual present practice, and with the grain thereof extending lengthwise of the direction of travel of the veneer through the dryer.

The decks or conveyors of the dryer are alike and merely the middle deck will be described in detail. The duplicate or corresponding parts of the top and bottom decks are designated by the same reference characters with prime and double prime marks applied to indicate the top and bottom decks, respectively.

The middle deck or conveyor of the dryer is of the double roll type and comprises a plurality of horizontally spaced pairs of top and bottom rolls 12 and 13, respectively, extending transversely of the length of the dryer, that is, transversely of the direction in which the material to be dried travels through the dryer. Each pair of rolls is identical and is supported and driven in the same manner. The rolls of each pair are alike and have journal sections at their opposite ends by means of which they are rotatably supported in brackets 14 and 15 near opposite sides of the dryer. The brackets 14 and 15 are detachably bolted to elongated angular-shaped frame members 16 and 17 extending lengthwise of the dryer near opposite sides thereof. The reduced journal projections of the lower rolls 13 project through cylindrical apertures in the brackets 14, 15 at opposite ends thereof and are thus supported for rotation about fixed axes. The journal projections at opposite ends of the upper rolls 12 project through vertically elongated slots in the brackets, which slots permit the upper roll 12 of each pair of rolls to move away from the lower roll directly therebelow upon the entrance of veneer between the rolls. The weight of the upper rolls 12 normally maintains them in contact with the rolls 13 therebelow or the veneer passing between the rolls.

The lower roll 13 of each pair is driven by a sprocket chain 20 extending through the dryer and received about a driven sprocket in a drive rig or unit G located adjacent to the exit end of the dryer and an idle sprocket in an automatic chain tightener unit H, located adjacent to the other or wet end of the dryer. The drive rig or unit G is of commercial construction and will not be described in detail. Suffice it to say that it includes an electric drive motor 21 connected to a variable speed transmission 22. The automatic chain tightener is also of commercial construction and will not be described in detail. The upper reach of the sprocket chain engages the upper part of sprocket wheels 23 keyed to the ends of the journal sections of the lower roll 13 projecting to the outside of the brackets 14. From the chain tightener, the lower reach of the sprocket chain passes underneath the sprocket wheels 23 back to the drive rig. Suitable brackets 24 are provided for holding the upper reach of the sprocket chain in engagement with the sprocket chain in its return to the drive rig.

Figure 1:
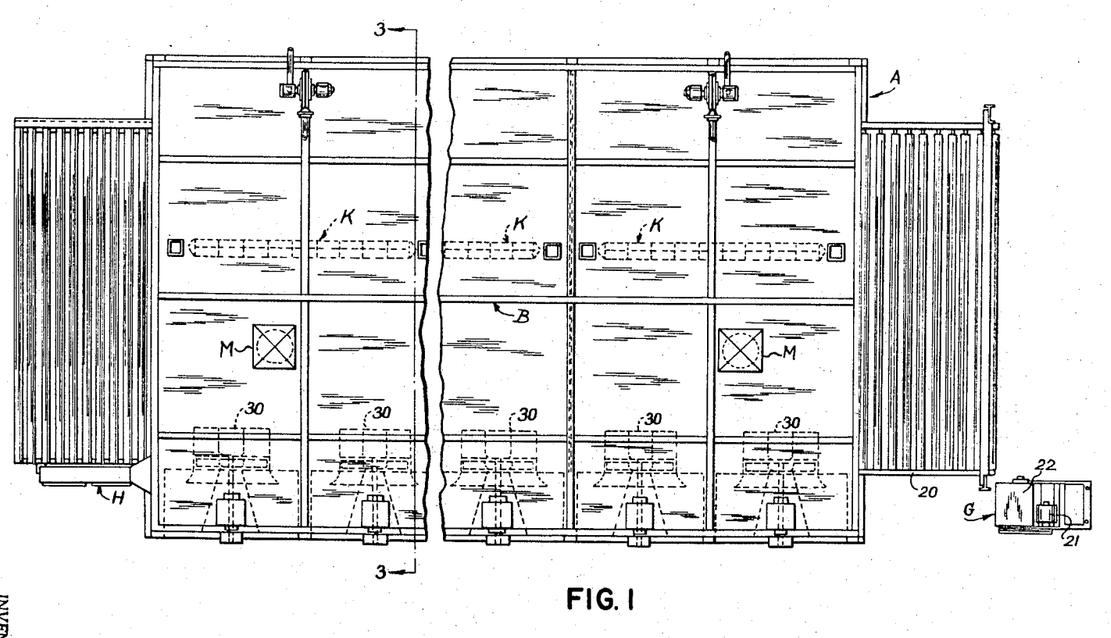
FIG. 1 is a plan view of a dryer embodying the present invention.
Figure 2:
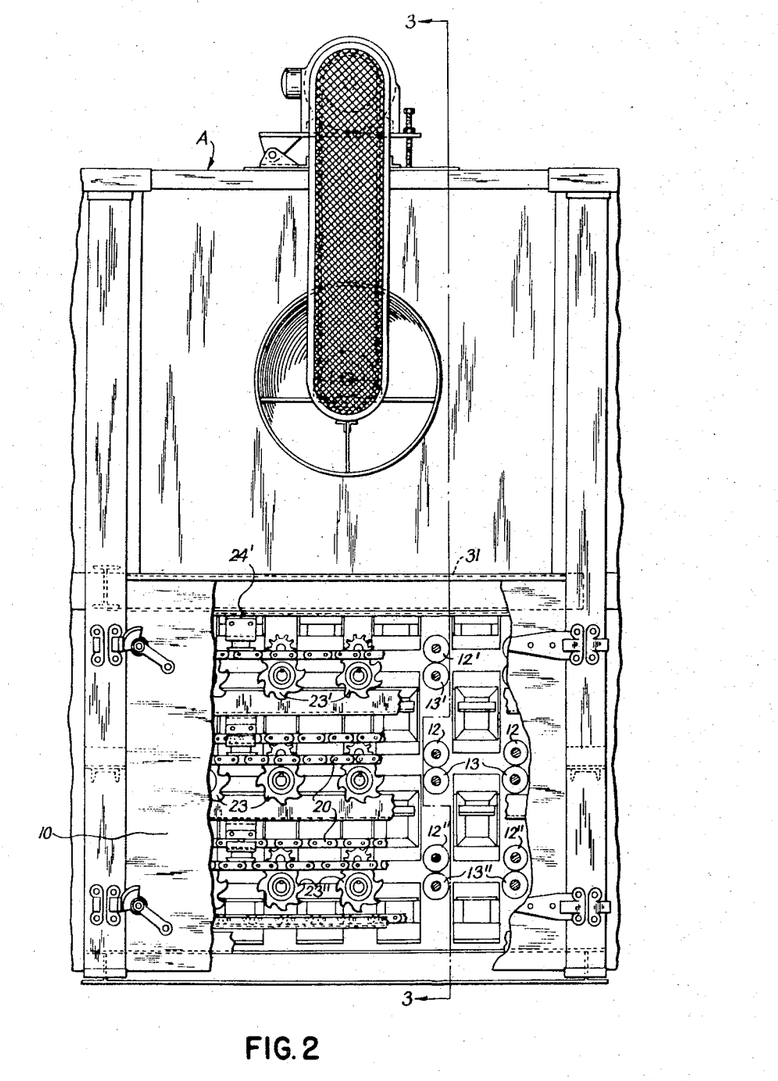
FIG. 2 is a fragmentary side elevational view of the dryer shown in FIG. 1 with parts broken away.
Figure 3:
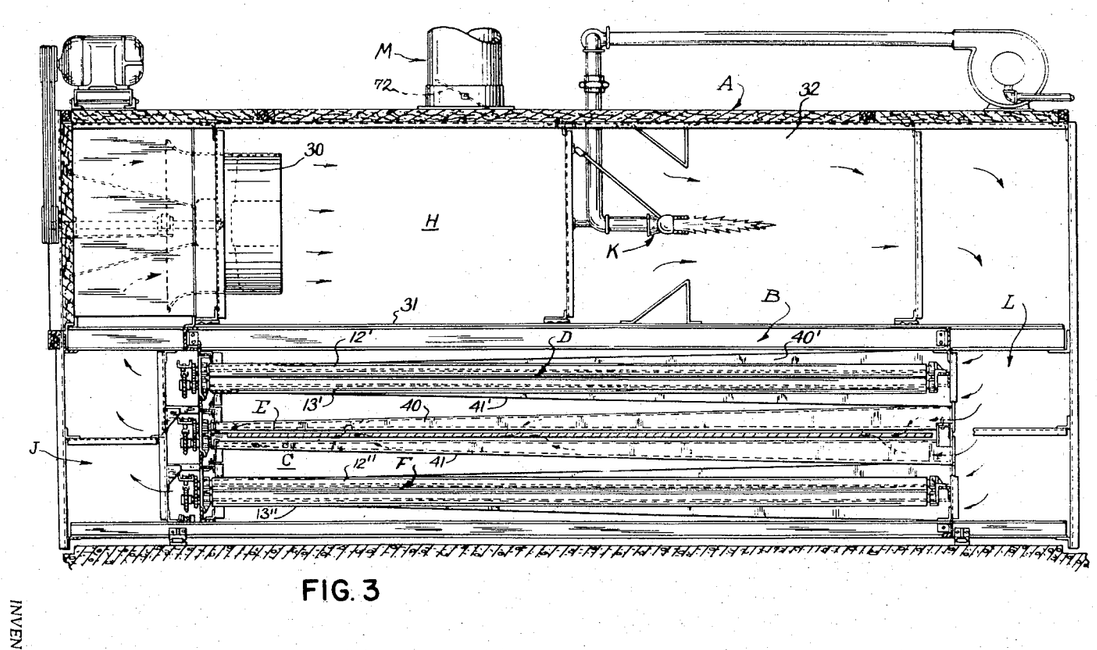
FIG. 3 is a sectional view approximately on the line 3—3 of FIG. 2, with portions in elevation.
Figure 4:
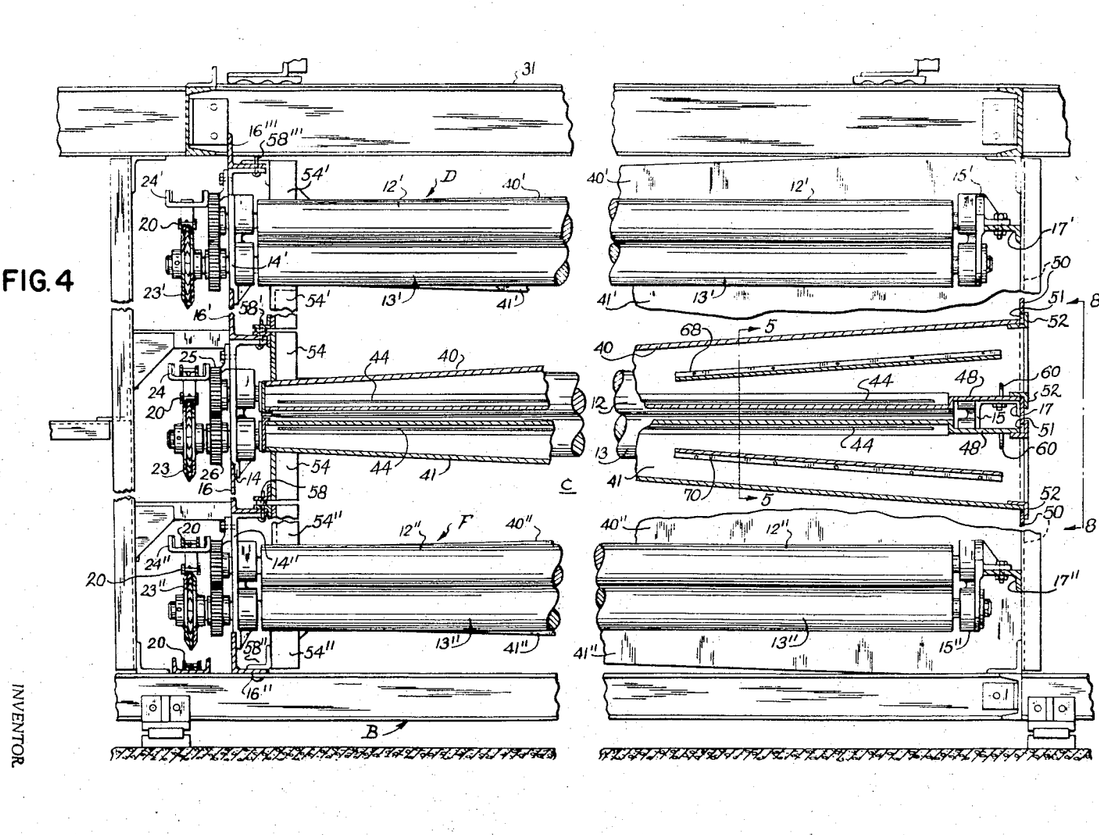
FIG. 4 is an enlarged fragmentary view of portions of FIG. 3 showing a pair of conduits in section.
Figure 5:
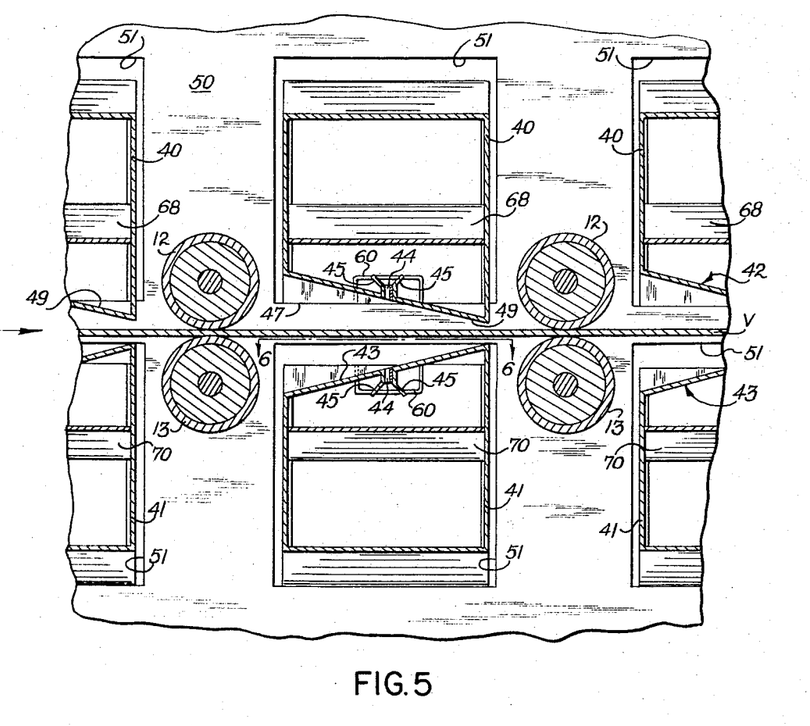
FIG. 5 is a sectional view taken substantially along line 5—5 of FIG. 4.
Figure 6:
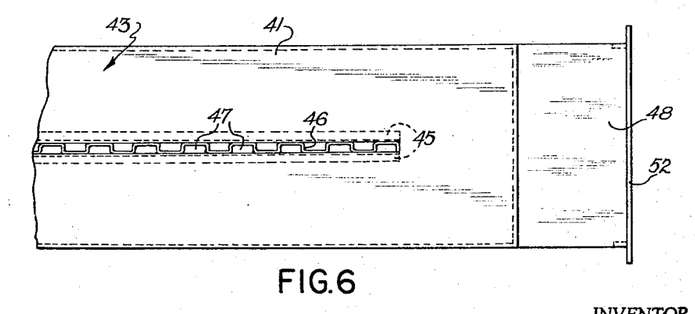
FIG. 6 is a plan view of a conduit taken substantially along line 6—6 of FIG. 5 and showing the side of the conduit facing the material.
Figure 7:
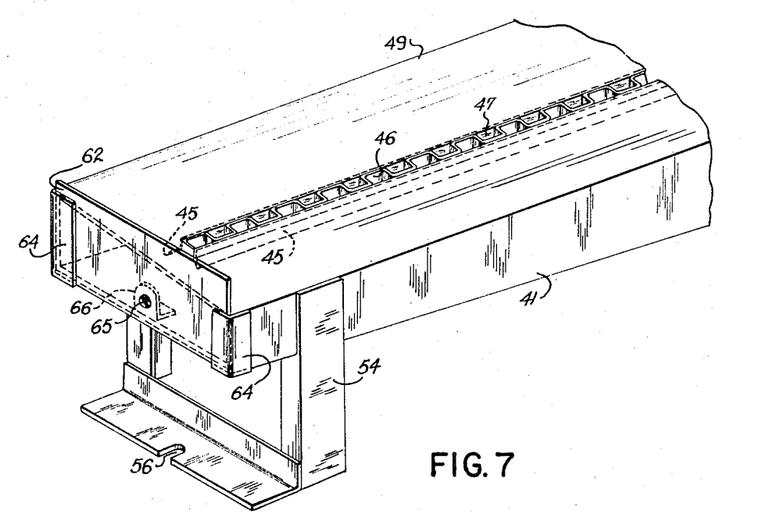
FIG. 7 is a perspective view on an enlarged scale showing the closed end of one of the conduits.
Figure 8:
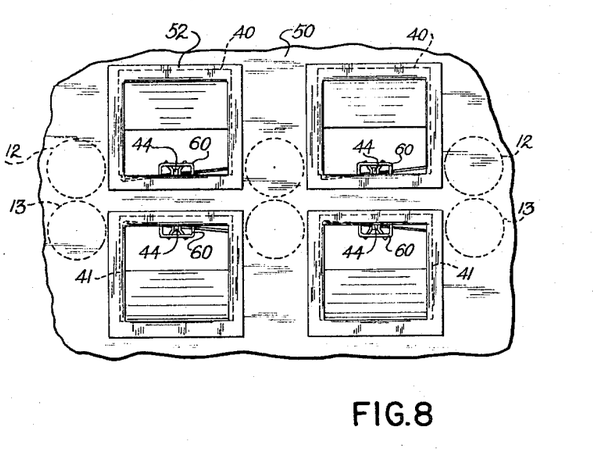
FIG. 8 is an elevational view of a portion of the dryer taken approximately along line 10—10 of FIG. 4.

The upper roll 12 of each pair is driven at substantially the same speed as the lower roll by interengaging gear wheels 25, 26 keyed to the journal projections of the rolls 12, 13 at the near side of the dryer, as viewed in FIGS. 1 and 2. These gear wheels are so constructed that they remain in mesh even though the upper roll 12 may operate a short distance from the lower roll as the veneer passes therebetween. The dryer shown is intended to be hand fed and the conveyors D, E, F merely extend beyond opposite ends of the dryer proper with the upper rolls of the extension at the wet end omitted. The dryer can, if desired, be provided with an entrance section at the wet end of the dryer, a cooling section at the dry end of the dryer and a so-called mechanical feeder.

Drying fluid, in the present instance heated air, is directed against opposite sides of the veneer and circulated and/or recirculated through the drying chamber or chambers C in the lower part of the dryer by a plurality of electric motor driven centrifugal fans 30 located in an air duct or ducts H formed in the upper part of the dryer housing by a horizontal partition or partitions 31.

The dryer illustrated comprises side-by-side units or sections formed by vertical partitions 32 in the upper part of the dryer, that is, the part above the horizontal partition 32. The partitions may extend the entire height of the dryer, if desired, and thus divide the lower part, that is, the part through which the conveyors D, E, F extend into separate chambers. Each unit or section is provided with two fans 30 and two heating units K. During operation different sections of the dryer are preferably maintained at different temperatures with the first section or unit at the wet end of the dryer being maintained at the highest temperature and succeeding section at progressively lower temperatures. The preferred temperature at the wet end is between 300° F. to 450° F. while that at the dry end is between 300° F. and 375° F. A graduation of temperatures can be maintained in dryer without partitions in the drying chamber or lower part of the dryer. The vertical partitions 32 in the upper part of the dryer can also be eliminated thus providing one large heating compartment, if desired.

Opposite sides of the dryer housing are spaced from the opposite side of the conveyors D, E, F thus providing chambers J and L for the circulation of air successively through the drying and heating chambers. As the air passes from the fans it is heated by direct fired gas heaters comprising elongated gas burners K. It is to be understood, however, that other heating means, such as steam heated radiators may be employed. From the burners K the heated or reheated air continues through the chambers H and through the manifold or chamber L at the rear side of the dryer to a plurality of elongated air ducts or conduits 40 and 41 located adjacent to opposite sides of the path along which the material to be dried is conveyed. The air ducts 40, 41 extend transversely through the dryer chamber and are interposed between the pairs of conveyor rolls. The air ducts or conduits 40, 41 are trapezoidal in cross-sectional shape, are of diminishing cross-sectional area from the ends thereof in which the air enters towards their opposite ends, have sides 42 and 43, respectively, disposed adjacent to the veneer path, and which sides are provided with air discharge means comprising elongated slots 44 having inwardly extending flanges 45 along their opposite elongated sides between which a serpentine shaped strip or member 46 is secured to divide the same into a plurality of apertures 47 and through which air is directed from the interior of the conduit at relatively high velocity toward and against opposite sides of the veneer to be dried and in a direction which is generally normal thereto. The free edges of the flanges 45 are flared away from one another to facilitate the entrance of air into the apertures 47.

Each of the sides 42 and 43 of the conduits 40, 41 which sides face the path of travel of the veneer includes a short portion at the inlet ends of the conduits the surface 48 of which portion is substantially parallel to the path of movement of the veneer and a portion which has a surface 49 which slopes toward and in the direction of the path of travel of the veneer. The inclined surfaces 49 form upper and lower converging guide means to return the veneer to the prescribed path of travel between the rolls in the event it deviates therefrom. The sharp portions of the conduits adjacent to the end through which the heated air enters and which have the surfaces 48 parallel to the path of travel of the veneer are provided to facilitate the insertion of the conduits in the particular supporting structure therefore employed in the embodiment shown.

The conduits are mounted so as to be readily removable to provide access to the drying chamber and for repair or replacement thereof. The rear or air inlet ends of the conduit are supported by plates 50 which form a continuous wall defining the rear side of the drying chamber C except for rectangular openings 51 therein which receive and support the inlet ends of the conduits. Flanges 52 welded or otherwise secured to the ends of the conduits project outwardly of the conduits and engage the outside surface of plates 50 to limit inward axial movement of the conduits and close the gaps between the conduits and openings through which they project and which are larger than the cross-sectional areas of the inlet ends of the conduit to accommodate the sloping surface 48 during installation and removal of the conduits. The construction is such that the circulating air will be forced into the drying chamber through the conduit and not around the sides thereof. The near or left-hand end of the conduits 40, 41 are closed and are removably connected by angle brackets 54 to the longitudinally extending frame members 16. The brackets 54 have a longitudinal slot 56 beginning at the free edge and extending rearwardly therefrom adapted to receive a pin 58 upstanding from the horizontal flange of frame member 16. The pin 58 and slot 56 center the closed end of conduit on frame member 16 and prevent movement therebetween in the lengthwise direction of the dryer while permitting relative movement in the transverse direction i.e., widthwise of the dryer, to facilitate rapid mounting and removal of the conduits from frame members 16 in the course of installing and removing the conduits from the drying chamber. Air pressure in the conduits prevent them from moving outward through openings 51 in plates 50. The sliding-type conduit mountings permit quick removal or installation thereof by opening rear doors 10, on the rear side of the dryer grasping handle 60 provided in the conduit and pulling the conduits out of the drying chamber through opening 50. Removal of a conduit provides access to the interior of the drying chamber C through the front access doors or upon removal of one or more of the plates 50.

The front end of each conduit is closed by a removable end plate 62 which is slidably mounted relative to the adjacent sides by angle brackets 64 spaced from the ends of the side walls and the wall having the apertures 47 therein a sufficient distance to permit entry of plate 62 therebetween. The plate is secured in closing position by a fastener 65 extending through plate 62 and secured in an opening in a flange 66 upstanding from the conduit side opposite the side having the apertures therein. By removing fastener 65, end plate 62 is removable to permit the conduit to be cleaned out such as by blowing air therethrough. The serpentine-shaped member 46 prevents the veneer from entering the slot 44 when it is moving along surface 49 in the course of returning to the prescribed path of travel between the pairs of rolls. The apertures 47 do not interfere with the smooth and substantially continuous nature of the inclined surface 49 of the conduits, consequently, ends of veneer contacting the surfaces 48 are guided therealong and do not tend to bind in the apertures 47. The apertures 47 may be formed in ways other than shown, such as by punching a plurality of holes therein.

Baffles 68 and 70 are provided within the air ducts 40, 41 to obtain a uniform or substantially uniform distribution of the heated air through the lengths of the ducts or the width of the dryer. By suitable arrangements of baffles within the air ducts or conduits 40 and 41 and apertures in the sides 42 and 43 thereof facing the material path any or substantially any desired distribution of air on the adjacent sides of the material can be obtained.

As previously mentioned, the inclined converging portions 48 of the sides 42 and 43 of the conduits return the veneer to its prescribed path of movement between the pairs of rolls 12 and 13 to avoid jamming of the material as it is being conveyed by the rollers through the drying chamber. This guiding feature is particularly useful in drying very thin veneer in the order of from $\frac{1}{22}$ to $\frac{1}{26}$ of an inch thick, which material is very flexible and tends to deviate or veer from its path of travel as it moves through the rolls. Also due to elimination of the jamming problem to the guiding function performed by the inclined conduit surfaces 48 the conduits and more particularly the air discharge openings 47 therein can be positioned close to the upper and lower surfaces of the veneer which provides for more effective impingement of the heated air onto the veneer surfaces. As the air flows through openings 47 it moves across the surface of the veneer and the spent air drifts or moves to the sides of the air conduits and finds its way up or down between the air conduits and the rolls adjacent thereto into the space between conveyors and eventually into the chamber J at the near side of the dryer housing where it is again circulated by the fans.

Each of the chambers H is provided with an exhaust stack having a damper 72 which may be used to control the entrance of fresh air to the unit. The heating chamber H is provided with suitable baffles to confine the flow of air to the fans into the vicinity of the gas burners, etc.

Referring to the dryer shown, the conveyor rolls are 3¾ inches in diameter and spaced on 12 inch centers and the ducts are approximately 6¾ inches wide. The apertures 47 of the air ducts are spaced 1¼ inches from the veneer path and the leading edge of surfaces 48, 49 is spaced approximately 1¾ inches from the material path and the trailing edge thereof is approximately ¾ inch from the path of travel of the veneer. The slope of sides 49 are at approximately 8 degrees to the path of travel of the veneer. This inclination or slope has been found effective to provide the necessary guiding and drying of the type of veneer described herein.

The air circulating fans are preferably such that the speed or velocity of the heated air as it passes through and discharges from the apertures 47 in the air ducts or conduits 40, 41 is between thirty-five hundred and forty-five hundred feet per minute. This construction provides sufficient heated air to effective dry, for example, pine ranging in thickness between $\frac{1}{10}$ to ¼ of an inch in six to forty minutes, respectively, and Douglas fir in the same thickness range in two to twenty minutes, respectively. As stated previously, the roller conveyors can be driven at different speeds and the speed thereof can be set to correspond to the required drying time of the particular veneer to be dryed. It is to be understood, however, that the conveyor rolls and air conduits may be of any suitable size and arranged in any suitable manner. For example, the pairs of rolls of one or more decks could be staggered with respect to the pairs of rolls of another or other decks and the respective conduits of each pair of conduits could be staggered instead of being vertically aligned and could be spaced other than between each pair of rolls. The apertures in the air duct may be of any suitable configuration such as round, square, rectangular, etc., and may be of any desired size, number and/or spacing, etc., all to best suit different conditions and the different types of veneer to be dried. While the air conduits shown are rectangular in cross section it is to be understood that other cross-sectional shapes may be used and the inclination of sides of either the top or bottom conduits facing the veneer path may be varied from that shown including being curved lengthwise of the direction of which the veneer travels through the dryer without departing from the scope of the invention if such an arrangement would be desired.

From the foregoing description of the preferred embodiment of the invention, it will be apparent that the objects heretofore enumerated and others have been accomplished and that there has been provided a novel and improved veneer dryer wherein the veneer being dried is effectively guided and maintained in its prescribed path as it moves through the drying chamber and while so moving is acted upon by jets of heated air which strike the veneer at high velocity and effectively dry the veneer. While the preferred embodiment of the invention has been described in considerable detail, it is to be understood, as previously stated, that the invention is not limited to the particular structure shown but it is the intention to hereby cover all adaptations, modifications and uses thereof which come within the practice of those skilled in the art to which the invention relates and the scope of the appended claims.

I claim:

1. An apparatus for drying veneer comprising an elongated enclosure, conveyor means in said enclosure for coveying veneer to be dried through said enclosure in a path of travel, conduit means extending transversely of the length of said enclosure adjacent to opposite sides of said path of travel and having guide surfaces facing the veneer conveyed by said conveying means, at least one of said guide surfaces being inclined toward said path of travel in the direction in which the veneer is conveyed and effective to return the veneer to said path of travel when veering therefrom, said conduit means having discharge means on the sides thereof facing said path of travel arranged to discharge a drying medium onto opposite sides of veener being moved therepast by said conveying means, means for circulating under pressure a drying medium through said conduit means and said discharge means and means for heating said drying medium.

2. An apparatus for drying veneer comprising an elongated enclosure, conveyor means in said enclosure for conveying veneer to be dried through said enclosure in a path of travel, conduit means extending transversely of the length of said enclosure on opposite sides of said path of travel and having relatively even inclined guide surfaces converging toward said path of travel and effective to return material to said path when veering therefrom as the veneer is conveyed by said conveying means, said conduit means having apertures in the side thereof facing said path of travel arranged to discharge a drying medium onto opposite sides of veneer being moved therebetween by said conveying means, means for circulating under pressure a drying medium through said conduit means and said apertures, and means for heating said drying medium.

3. An apparatus for drying veneer, comprising an elongated enclosure, conveyor means in said enclosure for conveying veneer to be dried through said enclosure in a generally horizontal path of travel, conduit means extending transversely of the length of said enclosure on opposite sides of said path of travel and having opposing inclined guide surfaces facing said path of travel of the veneer, said inclined surfaces converging toward said path of travel in the direction of travel of the veneer and effective to return the veneer to said path of travel in the event it deviates therefrom in the course of being conveyed by said conveying means, said conduit means having discharge means including apertures in the sides thereof facing said path of travel arranged to discharge a drying medium onto opposite sides of veneer being moved therebetween by said conveying means, projections extending from said apertures into the interior of said conduit means, means for circulating under pressure a drying medium through said conduit means said projections and said apertures against opposite sides of veneer conveyed by said conveyor means, and means for heating said drying medium.

4. An apparatus for drying veneer comprising an elongated enclosure, conveyor means in said enclosure and arranged to convey veneer to be dried through said enclosure in a path of travel, conduit means extending transversely of said enclosure adjacent to opposite sides of said path of travel having relatively even surfaces facing the veneer conveyed which surfaces are inclined relative to said path and effective to guide the veneer toward said path when it veers therefrom during conveyance, discharge means including a plurality of spaced apertures arranged in at least one row in each of said guide surfaces, the portion of said surface surrounding said spaced apertures defining an even continuation of said inclined surface, means for circulating under pressure a drying medium through said conduit means and said apertures against the material, and means for heating said drying medium.

5. In an apparatus for drying veneer, an elongated enclosure, conveyor means in said enclosure spaced from opposite side walls thereof for conveying veneer to be dried longitudinally through said enclosure along a path of travel, said conveyor means comprising a plurality of horizontally spaced pairs of horizontally oriented rolls extending transversely of the length of said enclosure having one roll of each pair above to the other and between which the veneer to be dried is conveyed along said path, means for driving said rolls, a plurality of discrete elongated conduits removably supported at opposite sides of said path of travel between a plurality of said pairs of rolls and having a plurality of gas discharge openings therein and through which a drying medium is directed onto opposite top and bottom surfaces of the veneer as it moves along said path, means for circulating a drying medium through said conduits and through said discharge openings and against opposite sides of the veneer, and means for heating said drying medium.

6. In an apparatus for drying veneer, an elongated enclosure, conveyor means in said enclosure spaced from opposite side walls thereof for conveying veneer to be dried longitudinally through said enclosure along a path of travel, said conveyor means comprising a plurality of horizontally spaced pairs of horizontally oriented rolls extending transversely of the length of said enclosure having one roll of each pair above the other and between the respective rolls of each pair veneer to be dried is conveyed along said path, means for driving said rolls, a plurality of discrete elongated conduits arranged in pairs disposed between said pairs of rolls and being located on opposite sides of said path and have opposing inclined guide surfaces converging toward said path in the direction of veneer travel cooperating to return veneer toward said path if it veers to either side of said path, each of said conduits having a plurality of gas discharge openings in the sides thereof facing said path of travel and through which a drying medium is directed onto the surfaces of the veneer, means for circulating drying medium through said conduits and through said discharge openings and against opposite sides of the veneer, and means for heating said drying medium.

7. An apparatus for drying sheet material such as veneer comprising an elongated enclosure the cross-sectional shape of which is generally rectangular, means forming a vertical wall spaced from one of said side walls of said enclosure and defining with said one side wall of said enclosure a chamber, conveyor means in said enclosure at the side of said vertical wall opposite said one wall for conveying material to be dried longitudinally through said enclosure in a path of travel, said conveyor means comprising a plurality of horizontally spaced pairs of horizontal rolls extending transversely of the length of said enclosure having one roll of each pair above the other and between the respective rolls of each pair material to be dried is conveyed along said path, means for driving said rolls, discrete elongated conduit means having one end open and the other end closed removably supported in said enclosures closely adjacent to and on opposite sides of said path of travel of the material and having their open ends supported in said vertical wall and opening into said chamber, each of said conduit means having at least a portion of the side thereof facing said path of travel sloping toward said path of travel in the direction of material movement through said rolls effective to maintain the material in said path by returning the material to said path in the event it veers therefrom, a plurality of apertures in said side through which a drying medium is directed onto the surfaces of the material, means for circulating under pressure a gaseous drying medium through said chamber and in turn said conduit means and said apertures whereby said drying medium is caused to engage at high velocity opposite sides of material conveyed by said conveyor means, and means for heating said drying medium.

8. An apparatus for drying sheet material such as veneer comprising an elongated enclosure the cross-sectional shape of which is generally rectangular, conveyor means in said enclosure spaced from opposite side walls thereof for conveying material to be dried longitudinally through said enclosure along a path of travel, said conveyor means comprising a plurality of horizontally spaced pairs of horizontal rolls extending transversely of the length of said enclosure having one roll of each pair above the other and between the respective rolls of each pair material to be dried is conveyed along said path, means for driving said rolls, a plurality of discrete elongated conduit means having one end open and the other end closed removably supported between each pair of said rolls closely adjacent to and on opposite sides of said path of travel of the material, each of said conduit means having an inclined even surface sloping toward said path of travel in the direction of material movement through said rolls effective to maintain the material in said path by returning the material to said path in the event it veers therefrom, a plurality of apertures in said surface through which a drying medium is directed onto the surfaces of the material, means for circulating under pressure a gaseous drying medium through said conduit means and said apertures whereby said drying medium is caused to impinge at high velocity against opposite sides of material conveyed by said conveyor means, and means for heating said drying medium.

9. The apparatus as defined in claim 8 wherein said closed conduit end includes a gate movably secured to said conduit and effective when moved to provide an open ended conduit which can be readily cleaned or repaired.

References Cited by the Examiner

UNITED STATES PATENTS

| | | | |
|---|---|---|---|
| 822,997 | 6/1906 | Smith | 34—41 X |
| 1,573,379 | 2/1926 | Elmendorf | 34—41 X |
| 2,767,485 | 10/1956 | Holden | 34—205 |
| 2,823,467 | 2/1958 | Minami | 34—205 |
| 2,928,185 | 3/1960 | Drew | 34—122 |

KENNETH W. SPRAGUE, *Primary Examiner.*